US006543599B2

(12) United States Patent
Jasinetzky

(10) Patent No.: US 6,543,599 B2
(45) Date of Patent: Apr. 8, 2003

(54) STEP FOR ESCALATORS

(75) Inventor: Arthur Jasinetzky, Munich (DE)

(73) Assignee: Georg Fischer Mossner GmbH, Munich (DE)

( * ) Notice: Subject to any disclaimer, the term of this patent is extended or adjusted under 35 U.S.C. 154(b) by 0 days.

(21) Appl. No.: 10/008,328

(22) Filed: Nov. 7, 2001

(65) Prior Publication Data

US 2002/0074211 A1 Jun. 20, 2002

(30) Foreign Application Priority Data

Nov. 8, 2000 (DE) ........................................ 100 55 356

(51) Int. Cl.[7] ................................................ B65G 23/12
(52) U.S. Cl. ........................................................ 198/333
(58) Field of Search .......................................... 198/333

(56) References Cited

U.S. PATENT DOCUMENTS 5,337,879 A * 8/1994 Fischer ........................ 198/333
5,350,049 A * 9/1994 Ahls et al. .................. 198/333
5,358,089 A * 10/1994 Reidel ........................ 198/333
5,441,140 A * 8/1995 Reid .......................... 198/333
5,810,148 A * 9/1998 Schoeneweiss ............. 198/333
6,398,003 B1 * 6/2002 Jasinetzky .................. 198/333

FOREIGN PATENT DOCUMENTS

DE 196 51 585 8/1998
EP 0 945 391 9/1999

OTHER PUBLICATIONS

Patent Abstracts of Japan Publication No. 11292441, Tread for Escalator, By Ogawa Yutaka, published Oct. 26, 1999.

* cited by examiner

*Primary Examiner*—James R. Bidwell
(74) *Attorney, Agent, or Firm*—Bachman & LaPointe, P.C.

(57) ABSTRACT

The invention proposes a step for escalators comprising a tread and an arcuate skirt adjoining the tread, it being the case that the tread and the skirt have reinforcing ribs and/or reinforcing spars arranged on an inner surface for reinforcing purposes, and it being the case that a connecting structure for connecting the step to a drive arrangement is provided between a front edge region of the tread, as seen in the direction of travel, and a remote edge region of the skirt, it being possible for the step to be produced as a light-metal casting, and it being the case that the outer surface of the tread and of the skirt is formed from plastic by injection moulding.

13 Claims, 3 Drawing Sheets

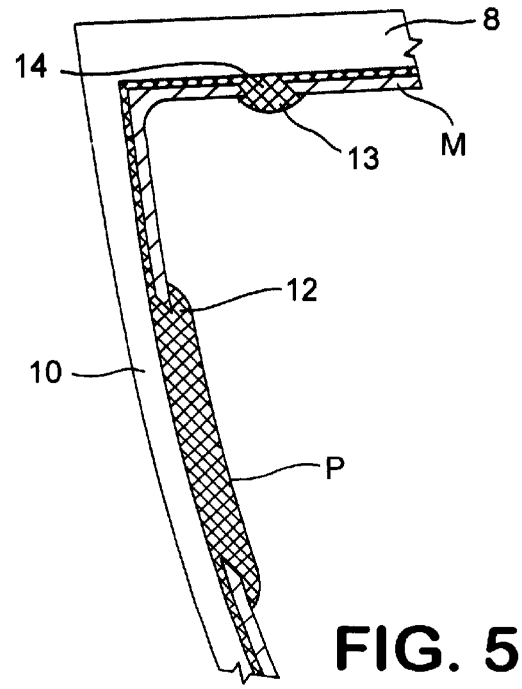
FIG. 5
FIG. 6
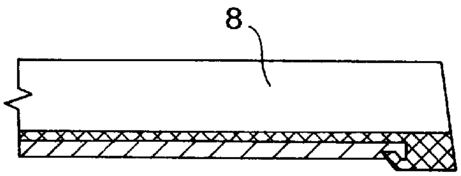
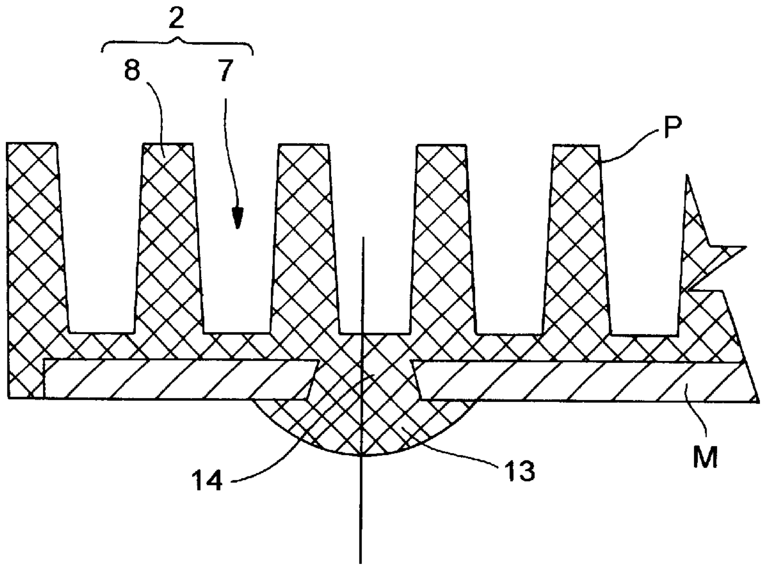
FIG. 7

STEP FOR ESCALATORS

BACKGROUND OF THE INVENTION

The present invention relates to a step for escalators comprising a tread and an arcuate skirt adjoining the tread. The tread and the skirt have reinforcing ribs and/or reinforcing spars arranged on an inner surface in order to reinforce the step. A connecting structure for connecting the step to a drive arrangement is provided between a front edge region of the tread, as seen in the direction of travel, and a remote edge region of the skirt. It is preferred that the step be produced from a light-metal casting.

In order to convey people in public places, escalators are used as an alternative to lifts. The escalator step has to meet various requirements. It is necessary for the step to be lightweight and stable and not to be affected by dirt and damage. The individual steps, which are produced and used in large numbers, have to be produced with narrow tolerances, as far as the dimensional accuracy is concerned, even in the case of temperature fluctuations.

An escalator step is known from EP 945 391 A2. The step is produced, in a first production stage, from glass-fibre-reinforced plastic by injection moulding. In order to give the individual step the necessary stability, the step is reinforced in the rear edge region of the tread, transversely to the direction of travel of the step, with a hollow metal profile. In a further process stage, following the injection moulding, the metal profile is inserted into a supporting structure and secured in captive fashion by pins.

An escalator step of the generic type is known from DE 196 51 585 A1. A plastic edge strip is extruded over the side edges and the front edge of the step body. The step body has a flange region which can be introduced into an injection mould and have plastic injected over it. The injection mould is made up of a mould element, a mating mould element and of the flange region of the step body. Three mould elements thus have to be assembled with sufficient sealing force for the plastic injection moulding.

It is an object of the invention to provide a step for escalators which has the lowest possible overall weight and can be produced in a straightforward production process without any additional assembly outlay.

SUMMARY OF THE INVENTION

The foregoing object is achieved by providing a step for escalators comprising a tread and an arcuate skirt adjoining the tread, the tread and the skirt have reinforcing ribs and/or reinforcing spars arranged on an inner surface in order to reinforce the step, and a connecting structure is provided for connecting the step to a drive arrangement between a front edge region of the tread, as seen in the direction of escalator travel, and a remote edge region of the skirt. The step may be produced from a light-metal casting, and preferably the outer surfaces of the tread and of the skirt are formed from plastic by injection moulding.

It is advantageous for the step, as far as possible, not to be affected by dirt and to be capable of being cleaned as easily as possible. This is achieved in that grooves and ridges running in the longitudinal direction of the escalator are formed on the outer surface of the tread, and in that further grooves and ridges are formed on the outer surface of the skirt, the ridges having a plastic coating which covers the surfaces on all sides.

It is further advantageous for the step to have the lowest possible overall weight. This is achieved in that grooves and ridges running in the longitudinal direction of the escalator are formed on the outer surface of the tread, and in that further grooves and ridges are formed on the outer surface of the skirt, the ridges being formed entirely from plastic by injection moulding. The plastic material for the coating may be selected such that the outer surface, which is subjected to the highest level of wear, can easily be cleaned or can even be rendered dirt-repellent. The plastic material can be dyed in different colours during formulation or provided with colour subsequently.

It is also advantageous that the step can be produced in a straightforward process. This is achieved in that formed in the casting between the outer surfaces and the inner surfaces of the tread and of the skirt are through-passages, which have the plastic injected through them from the outer surface to the inner surface during injection moulding. The step, which is produced, in a first process stage, as an aluminium casting by diecasting, is accommodated entirely in an injection mould in the following process stage and has the plastic material injected over the entire surface area at least of the outer surfaces.

It is further advantageous for the plastic coating of the step to be connected to the aluminium casting in as durable a manner as possible and with the best adhesion possible. This is achieved in that in the region of the through-passages, on the inner surface, anchorage means are moulded in one piece with the plastic coating on the outer surface.

BRIEF DESCRIPTION OF THE DRAWINGS

An exemplary embodiment of the invention is described with reference to the figures, in which:

FIG. 5 shows a section through the step along line AA from FIG. 4, FIG. 6 shows a further section through the step along line AA from FIG. 4, and FIG. 7 shows a section through a further exemplary embodiment of the step along line BB from FIG. 4.

DETAILED DESCRIPTION

Figure 1:
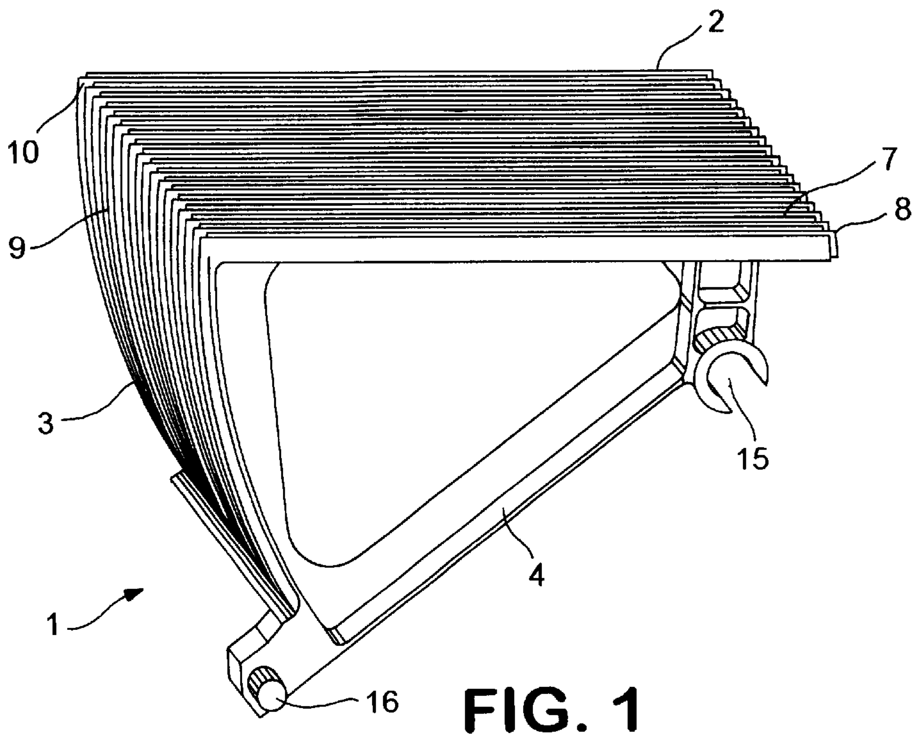
FIG. 1 shows a partial view, in perspective, of a step according to the invention.
Figure 2:
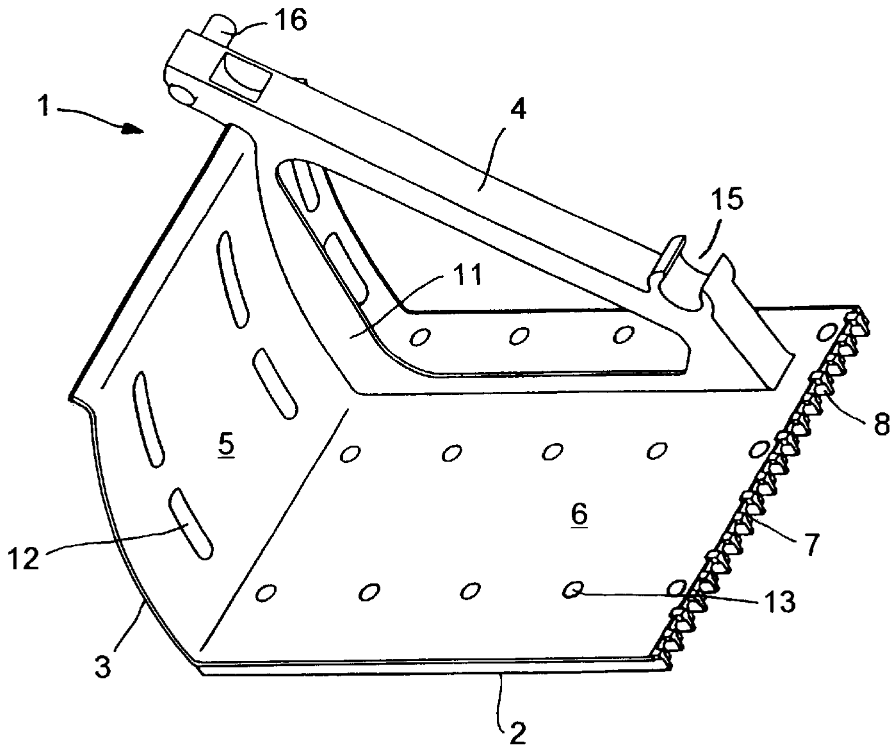
FIG. 2 shows a further partial view, in perspective, of the step from FIG. 1.

A step 1 for escalators is illustrated in perspective in FIGS. 1 and 2. Both figures illustrate merely half of a step 1. The step 1 is designed in a mirror-symmetrical manner to the left and right of the centre line, as seen in the direction of travel of the escalator. FIG. 1 illustrates the step 1 with a view of the outer surfaces, i.e. the surfaces which can be seen during normal operation. FIG. 2 illustrates the step 1 with a view of the inner surfaces 5, 6, i.e. the surfaces which cannot normally be seen. The step 1 comprises a metal portion M of having a plastic portion P bonded thereto in a manner described hereinbelow. The metal portion has a top surface to which the plastic portion is bonded to form a stepping surface. The stepping surface includes, at least in part, a tread 2. The step 1 further includes a skirt 3 and a connecting structure 4. In a first stage of the production process, the step 1 is produced in a single piece as a light-metal, for example aluminium-alloy, casting. The tread 2 essentially comprises a horizontally running panel on which grooves 7 and ridges 8 are formed on the outer surface in the longitudinal direction of the escalator. The tread 2 is adjoined to the rear, as seen in the direction of travel, by the skirt 3. The skirt 3 is essentially an arcuate panel on which plastic grooves 9 and ridges 10 are likewise formed. During operation of the escalator, the ends of the ridges 8 of the tread 2 move into the grooves 9 of the skirt 3 of the steps which adjoin to the front and rear in each case. This achieves the situation where the steps remain movable in relation to one another and where, at the same time, the interspace between two successive steps is rendered as inaccessible as possible to the escalator user. This means that the risk of injury to the escalator user is ruled out as far as possible. The connecting structure 4 essentially serves for connecting the step 1 to the drive arrangement (not depicted here) of the escalator. It can be seen particularly clearly in FIG. 2 how the step 1 has reinforcing ribs 11 on the inner surfaces 5, 6. Together with the connecting structure 4, the reinforcing ribs 11 serve for increasing the rigidity of the step 1. The ridges 8, 10 on the outer surfaces of the tread 2 and of the skirt 3 are not necessary for increasing the rigidity of the step 1 and could also be left out. They merely give a better grip to the outer surfaces, and the grooves formed between the ridges create space for collecting dirt.

Anchorage means 12, 13 can be seen on the inner surfaces 5, 6 in FIG. 2. The anchorage means 12, 13 consist of plastic material which, in a second stage of the production process for the step 1, is injected from the outer surface to the inner surface 5, 6 through through-passages 14, which are described hereinbelow.

Figure 3:
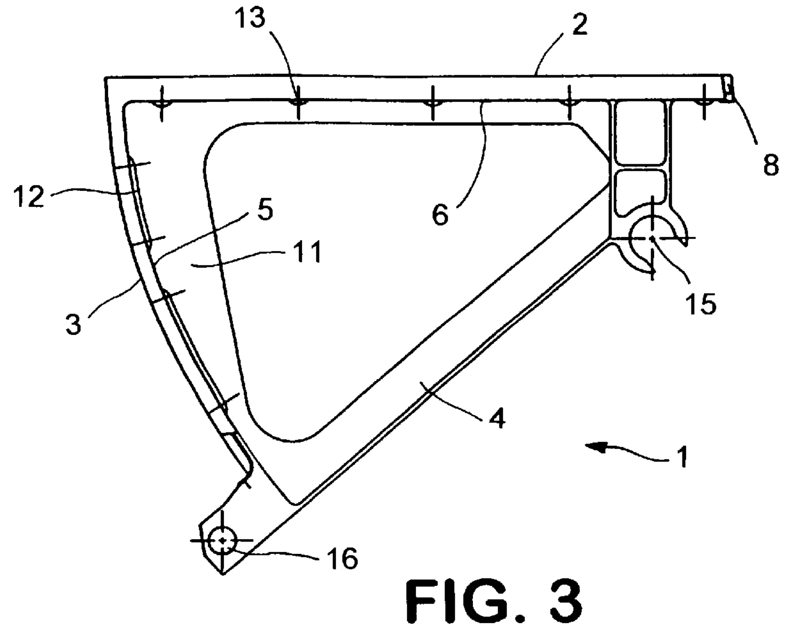
FIG. 3 shows a view of the step from FIG. 2.

FIG. 3 illustrates the step 1 as seen from the side of the escalator. In this case, the plastic-material anchorage means 12, 13 can likewise easily be seen on the inner surfaces 5, 6 of the tread 2 and of the skirt 3. The connecting structure 4 has a journal bushing 15 and a journal stub 16 for connection to an endless chain (not depicted) which is connected to the drive motor (not depicted either). It is also possible for the connecting structure 4 of the step 1 to be coupled together with the connecting structures of further steps to form a chain-like structure.

Figure 4:
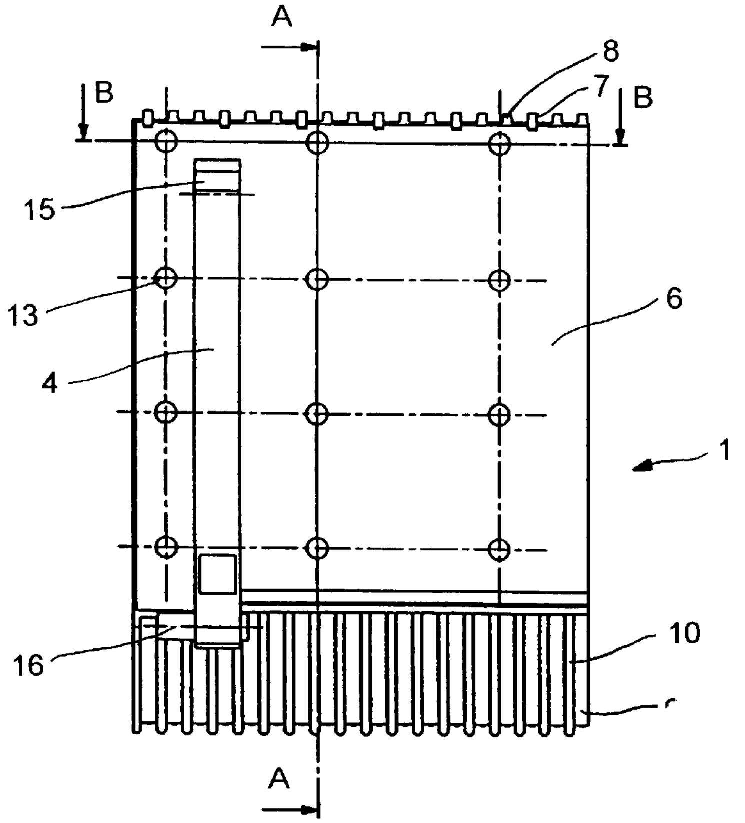
FIG. 4 shows a further view of the step from FIG. 2.

FIG. 4 illustrates the step 1 with a view of the inner surface 6. It can clearly be seen here how the ends of the ridges 8 of the tread 2 fit into the grooves 9 of the skirt 3.

FIGS. 5 and 6 illustrate, on an enlarged scale, the step 1, in section in certain areas, along line AA from FIG. 4. It can be seen in FIG. 5 how the through-passages 14 have had the plastic material injected through them from the outer surfaces of the skirt 3 and of the tread 2 to the inner surface 5, 6. The formation of the anchorage means 12, 13 on the inner surface 5, 6 of the step additionally secures the plastic coating or the plastic material extruded over the casting. FIG. 6 illustrates how the plastic material of the coating can be secured at the end of the tread 2. Depending on the loading to which the coated surfaces are subjected, it is possible for the coating to have a layer thickness of from a few tenths of a millimetre to a number of millimetres.

FIG. 7 illustrates, on an enlarged scale and in section, the tread surface of the step 1 along line BB from FIG. 4. It can be seen in the exemplary embodiment from FIG. 7 how the ridges 8 and the outer surface of the tread 2 can be produced entirely from plastic material. The more plastic material is used for the coating, the more it is possible to reduce the amount of metal used for the step, and the more lightweight the step becomes. This reduces the energy consumption for operating the escalator. The plastic material can be dyed during formulation or have colour provided on the visible surfaces. The plastic material may undergo a dirt-repelling treatment, with the result that the escalator can be cleaned more easily.

In order to produce the step, in a first stage, a single-piece light-metal casting is produced in a metal diecasting die. The diecasting die is considerably more straightforward to produce than the prior-art diecasting dies for steps. Following the production of the casting, the outer surfaces of the tread 2 and of the skirt 3 are flat and do not as yet have any ridges 8, 10. All that is required is for provision to be made for the through-passages 14 for the plastic material during the production of the metal diecasting die. In the next process stage, the casting is introduced into a plastic injection mould. The plastic injection mould is designed such that at least the outer surfaces of the step can be accommodated entirely in the mould. This makes it possible for the plastic injection mould to be produced with sealing surfaces which are as straightforward as possible. The plastic injection mould is designed such that the plastic material is fed on the side of the outer surfaces of the tread 2 and of the skirt 3. The mould is designed such that the grooves and the ridges 8, 10 are formed entirely from plastic material. The plastic material is injected through the through-passages 14. The plastic injection mould for the inside of the step is designed such that the plastic-material anchorage means 12, 13 are formed on the inner surfaces 5, 6.

What is claimed is:

1. A step comprising a metal portion having a top surface and a bottom surface and a plastic portion bonded to the top surface of the metal portion to form a stepping surface wherein the metal portion includes a plurality of through passages and plastic extends through the passage from the bottom surface to the top surface and wherein at least a portion of the stepping surface comprises a tread.

2. A step according to claim 1, further including a skirt portion extending downwardly from the stepping surface, the skirt portion comprising a plastic portion bonded to a top surface of a metal portion.

3. A step according to claim 1, wherein the tread includes substantially parallel grooves and ridges.

4. A step according to claim 2, wherein the tread includes substantially parallel grooves and ridges.

5. A step according to claim 4, wherein the plastic portion of the skirt portion includes substantially parallel grooves and ridges wherein the ridges of the skirt portion align with the grooves of the tread and the grooves of the skirt portion align with the ridges of the tread.

6. A step according to claim 1, wherein the bottom surface includes a plastic anchor means over each of said plurality of through holes for anchoring the plastic portion of the step.

7. In an escalator comprising moveable step secured to a drive means, an escalator step comprising a metal portion having a top surface and a bottom surface and a plastic portion bonded to the top surface of the metal portion to form a stepping surface wherein the metal portion includes a plurality of through passages and plastic extends through the passage from the bottom surface to the top surface and wherein at least a portion of the stepping surface comprises a tread.

8. A step according to claim 7, wherein the bottom surface includes a plastic anchor means over each of said plurality of through holes for anchoring the plastic portion of the step.

9. A step according to claim 7, wherein the bottom surface of the metal portion includes a connecting means for connection to the drive means.

10. A step according to claim 9, further including a skirt portion extending downwardly from the stepping surface, the skirt portion comprising a plastic portion bonded to a top surface of a metal portion.

11. A step according to claim 9, wherein the tread includes substantially parallel grooves and ridges.

12. A step according to claim 10, wherein the tread includes substantially parallel grooves and ridges.

13. A step according to claim 12, wherein the plastic portion of the skirt portion includes substantially parallel grooves and ridges wherein the ridges of the skirt portion align with the grooves of the tread and the grooves of the skirt portion align with the ridges of the tread.

* * * * *